US008589573B2

(12) United States Patent
Mirtorabi et al.

(10) Patent No.: US 8,589,573 B2
(45) Date of Patent: Nov. 19, 2013

(54) TECHNIQUE FOR PREVENTING ROUTING LOOPS BY DISSEMINATING BGP ATTRIBUTE INFORMATION IN AN OSPF-CONFIGURED NETWORK

(75) Inventors: Sina Mirtorabi, Santa Clara, CA (US); Mukhtiar Shaikh, San Jose, CA (US); Peter Psenak, Ivanka pri Dunaji (SK); Muhammad Ahmed Moizuddin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1330 days.

(21) Appl. No.: 11/370,468

(22) Filed: Mar. 8, 2006

(65) Prior Publication Data

US 2007/0214275 A1     Sep. 13, 2007

(51) Int. Cl.
*G06F 15/16* (2006.01)
(52) U.S. Cl.
USPC ........... 709/230; 709/220; 709/223; 709/224; 709/238; 709/245
(58) Field of Classification Search
USPC ................ 709/230, 220, 223, 224, 238, 245
See application file for complete search history.

(56) References Cited

U.S. PATENT DOCUMENTS

| | | | |
|---|---|---|---|
| 6,055,561 A * | 4/2000 | Feldman et al. .............. | 709/200 |
| 6,473,421 B1 * | 10/2002 | Tappan .......................... | 370/351 |
| 6,603,756 B1 * | 8/2003 | Tappan .......................... | 370/351 |
| 6,604,146 B1 * | 8/2003 | Rempe et al. ................. | 709/238 |
| 6,901,445 B2 * | 5/2005 | McCanne et al. ............. | 709/225 |
| 6,970,464 B2 * | 11/2005 | Xu et al. ....................... | 370/392 |
| 7,362,727 B1 * | 4/2008 | O'Neill et al. ................ | 370/331 |
| 2003/0046390 A1 * | 3/2003 | Ball et al. ..................... | 709/224 |
| 2003/0058797 A1 * | 3/2003 | Izmailov et al. .............. | 370/238 |
| 2003/0105865 A1 * | 6/2003 | McCanne et al. ............. | 709/225 |
| 2003/0161309 A1 * | 8/2003 | Karuppiah .................... | 370/392 |
| 2003/0204619 A1 * | 10/2003 | Bays ............................. | 709/238 |

(Continued)

FOREIGN PATENT DOCUMENTS

WO     WO-03/005649 A1     1/2003

OTHER PUBLICATIONS

K. Varadhan; RFC1403—BGP OSPF Interaction; Jan. 1993; Network Working Group; 13 Pages.*

(Continued)

*Primary Examiner* — Krista Zele
*Assistant Examiner* — Anthony Fabbri
(74) *Attorney, Agent, or Firm* — Novak Druce Connolly Bove & Quigg LLP

(57) ABSTRACT

A novel technique is provided for preventing routing loops by disseminating Border Gateway Protocol (BGP) attribute information in an Open Shortest Path First (OSPF) configured network. Specifically, a new OSPF sub-type-length-value (TLV) is introduced for transporting a conventional BGP autonomous system (AS) path attribute through the OSPF-configured network. Like the BGP AS-path attribute, the new OSPF AS-path sub-TLV is configured to store a set of AS numbers corresponding to the AS path of one or more advertised routes. Thus, when a network device receives an OSPF link-state advertisement (LSA) containing the novel AS-path sub-TLV, the network device determines whether it resides in an autonomous system whose AS number is stored in the sub-TLV. If so, the network device does not install the LSA's advertised routes in its link-state database since the routes, if installed, could result in routing loops.

27 Claims, 10 Drawing Sheets

(56) References Cited

U.S. PATENT DOCUMENTS

| | | | |
|---|---|---|---|
| 2004/0039839 A1* | 2/2004 | Kalyanaraman et al. | 709/238 |
| 2004/0044786 A1* | 3/2004 | Basso et al. | 709/238 |
| 2004/0177157 A1* | 9/2004 | Mistry et al. | 709/241 |
| 2004/0196827 A1* | 10/2004 | Xu et al. | 370/352 |
| 2004/0264465 A1* | 12/2004 | Dunk | 370/392 |
| 2005/0276217 A1* | 12/2005 | Gadgil et al. | 370/225 |
| 2006/0013232 A1* | 1/2006 | Xu et al. | 370/396 |

OTHER PUBLICATIONS

K. Varadhan; RFC1364—BGP OSPF Interaction; Sep. 1992; Network Working Group; 14 pages, especially pp. 4 and 5.*
Unknown author; Open Shortest Path First; Cisco Systems; Internetworking Technology Handbook; 6 Pages.*
R. Droms and J. Schnizlein; Feb. 2005; RFC 4014; Cisco Systems; Network Working Group; 10 Pages.*
Rosen et al.; BGP/MPLS IP VPNs; Network Working Group; Oct. 2004.*
Rosen et al.,; OSPF as the Provider/Customer Edge Protocol for BGP/MPLS IP VPNs; Mar. 4, 2005; Network Working Group; 24 pages.*
Rosen et al.,; OSPF as the Provider/Customer Edge Protocol for BGP/MPLS IP VPNs; Mar. 4, 2005; Wayback Machine:Internet Archive for Mar. 4th; 24 pages.*
PCT Notification of Transmittal of the International Search Report and the Written Opinion of the International Searching Authority, or the Declaration, International Application No. PCT/US07/03033, International Filing Date: Feb. 6, 2007, Date of Mailing: Nov. 29, 2007, 9 pages.
Labovitz, Craig, et al., "Internet Routing Instability," IEEE/ACM Transactions on Networking, Publication Date: Oct. 1998, vol. 6, Issue 5, p. 515-528, retrieved on Oct. 21, 2007, from URL http://www.cis.upenn.edu/~lee/99cis642/99cis642/papers/jahanian_sigcomm97.ps.gz.
Citation establishing publication date for Labovitz, Craig et al. "Internet Routing Instability," in IEEE/ACM Transactions on Networking, Publication Date: Oct. 1998, vol. 6, Issue 5, p. 515-528, retrieved on Oct. 21, 2007, from URL http://ieeexplore.ieee.org/xpl/freeabs_all.jsp?arnumber=731185.
Rosen, Eric C., et al., Network Working Group Internet Draft, entitled Using an LSA Options Bit to Prevent Loopin Gin BGP/MPLS IP VPNs (draft-ietf-ospf-2547-dnbit-04.txt), Mar. 2004, pp. 1-8.
Rosen, Eric C., et al., Network Working Group Internet Draft, entitled OSPF as the Provider/Customer Edge Protocol for BGP/MPLS IP VPNs (draft-ietf-l3vpn-ospf-2547-05.txt), Nov. 2005, pp. 1-27.
Mirtorabi, S., et al., Network Working Group Internet Draft, entitled Extensions to OSPFv2 for Advertising Optional Route/Link Attributes (draft-mirtorabi-ospf-tag-01.txt), Aug. 2005, pp. 1-19.
Rosen, E., et al., Network Working Group Request for Comments 2547, entitled BGP/MPLS VPNs, Mar. 1999, pp. 1-24.
Coltun, R., Network Working Group Request for Comments 2370, entitled the OSPF Opaque LSA Option, Jul. 1998, pp. 1-15.
Rekhter,, Y., at al., Network Working Group Request for Comments 1771, entitled a Border Gateway Protocol (BGP-4), Mar. 1995, pp. 1-54.
Moy, J., Network Working Group Request for Comments 2328, entitled OSPF Version 2, Apr. 1998, pp. 1-204.
Tanenbaum, Andrew S., "Computer Networks" Fourth Edition, Pearson Education, Inc., 2003, Section 1.4.2, pp. 41-44.
Rosen, Eric C., et al., "OSPF as the Provider/Customer Edge Protocol for BGP/MPLS IP VPNs," draft-ietf-l3vpn-ospf-2547-06.txt, Feb. 2006, pp. 1-26.
Supplementary European Search Report, European Application No. 07749940.8-2416 / 1997017, PCT/US2007003033, Applicant: Cisco Technology, Inc., Date of Mailing: Mar. 21, 2011, pp. 1-8.

* cited by examiner

TECHNIQUE FOR PREVENTING ROUTING LOOPS BY DISSEMINATING BGP ATTRIBUTE INFORMATION IN AN OSPF-CONFIGURED NETWORK

FIELD OF THE INVENTION

This invention relates generally to preventing routing loops in a computer network, and, more specifically, to a novel technique for transporting Border Gateway Protocol (BGP) attribute information in an Open Shortest Path First (OSPF) configured network so as to prevent routing loops.

BACKGROUND OF THE INVENTION

A computer network is a geographically distributed collection of interconnected subnetworks, such as local area networks (LAN), that transport data between network nodes. As used herein, a network node is any device adapted to send and/or receive data in the computer network. Thus, in the context of this disclosure, the terms "node" and "device" may be used interchangeably. The network topology is defined by an arrangement of network nodes that communicate with one another, typically through one or more intermediate network nodes, such as routers and switches. In addition to intra-network communications between network nodes located in the same network, data also may be exchanged between nodes located in different networks. To that end, an "edge device" located at the logical outer-bound of a first computer network may be adapted to send and receive data with an edge device situated in a neighboring (i.e., adjacent) network. Inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled Computer Networks, Fourth Edition, by Andrew Tanenbaum, published 2003, which is hereby incorporated by reference as though fully set forth herein.

A data packet may originate at a source node and subsequently "hop" from node to node along a logical data path until it reaches its destination. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Although IPv4 is prevalent in most networks today, IP Version 6 (IPv6) has been introduced to increase the length of an IP address to 128 bits (16 bytes), thereby increasing the number of available IP addresses. Typically, a network or subnetwork is allocated a predetermined set of IP addresses which may be assigned to network nodes situated within that network or subnetwork. Here, a subnetwork is a subset of a larger computer network, and thus network nodes in the subnetwork may be configured to communicate with nodes located in other subnetworks.

A subnet mask may be used to select a set of contiguous high-order bits from IP addresses within a subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. As used herein, an "address prefix" is defined as the result of applying a subnet mask to a network address, such as an IP address. An address prefix therefore specifies a range of network addresses in a subnetwork, and in IPv4 a /32 address prefix corresponds to a particular network address. A "route" is defined herein as an address prefix and its associated path attributes. The path attributes generally include any information that characterizes the address prefix, and may include various protocol-specific attributes, such as conventional Border Gateway Protocol attributes.

Interior Gateway Protocols (IGP)

A computer network may contain smaller groups of one or more subnetworks which may be managed as separate autonomous systems. As used herein, an autonomous system (AS) is broadly construed as a collection of interconnected network nodes under a common administration. Often, the AS is managed by a single administrative entity, such as a company, an academic institution or a branch of government. For instance, the AS may operate as an enterprise network, a service provider or any other type of network or subnetwork. Each AS is typically assigned a unique identifier, such as a unique AS number, that identifies the AS among a plurality of ASes in a computer network.

An AS may contain one or more edge devices (or "autonomous system border routers" (ASBR)), having peer connections to other edge devices located in adjacent networks or subnetworks. Thus, packets enter or exit the AS through an appropriate ASBR. The AS may be logically partitioned into a plurality of different "routing areas." Each routing area includes a designated set of network nodes that are configured to share routing and topology information. As such, the network nodes in a routing area share a consistent "view" of the network topology. Since consistent sets of intra-area, inter-area and inter-AS routing information are usually distributed among network nodes in an AS, the nodes can calculate consistent sets of "best paths" through the AS, e.g., using conventional shortest path first (SPF) calculations or other routing computations. A calculated best path corresponds to a preferred data path for transporting data between a pair of source and destination nodes. The best path may be an intra-area, inter-area or inter-AS data path, depending on the locations of the source and destination nodes.

Area border devices, such as area border routers (ABR), are located at the logical border of two or more routing areas. Accordingly, each ABR device participates in multiple routing areas and typically maintains a separate set of routing and topology information for each adjacent routing area in which it participates. Each network node in a routing area typically maintains its own link-state database (LSDB). The LSDB is configured to store topology information advertised with the node's routing area. Because an ABR (by definition) participates in multiple routing areas, each ABR therefore maintains a separate LSDB for each of its routing areas.

Network nodes located in the same routing area generally exchange routing information and network-topology information using an "interior gateway" routing protocol (IGP), such as a link-state protocol. An example of a conventional link-state protocol is the Open Shortest Path First (OSPF) protocol, which is described in more detail in Request for Comments (RFC) 2328, entitled *OSPF Version 2*, dated April 1998, which is publicly available through the Internet Engineering Task Force (IETF) and is hereby incorporated by reference in its entirety.

OSPF employs conventional link-state advertisements (LSA) for exchanging routing and topology information between a set of interconnected intermediate network nodes, i.e., routers and switches. In fact, different types of LSAs may be used to communicate the routing and topology information. For example, the OSPF version 2 specification (RFC 2328) defines the following types of LSAs: Router, Network, Summary and AS-External LSAs. Router and Network LSAs are used to propagate link information within a routing area. Specifically, Router LSAs advertise router-interface links (i.e., links connected to routers) and their associated cost values, whereas Network LSAs advertise network-interface links (i.e., links connected to subnetworks) and their associated cost values within the routing area.

Summary and AS-External LSAs are used to disseminate routing information between routing areas. The Summary LSA is typically generated by an ABR and is used to advertise intra-AS ("internal") routes between routing areas. First, the ABR receives various LSAs that are advertised in a first routing area. The ABR "summarizes" the advertised routes by aggregating routes where possible. Next, the ABR stores the summarized routes in a Summary LSA, which it then advertises in a second routing area. In this way, nodes in the second area are made aware of routes in the first routing area that can be reached through the ABR. An AS-External LSA stores a list of reachable inter-AS ("external") routes, i.e., located outside of the AS. The AS-External LSA is typically generated by an ASBR and is propagated throughout the AS to identify which external routes can be reached through the advertising ASBR. Unlike Summary LSAs, routes stored in an AS-External LSA are generally not aggregated.

Opaque LSAs provide an extensible LSA format for use with the OSPF protocol and are generally described in more detail in the IETF publication RFC 2370, entitled *The OSPF Opaque LSA Option*, published July 1998, by R. Coltun, which publication is hereby incorporated by reference as though fully set forth herein. As described in RFC 2370, opaque LSAs may be advertised ("flooded") between network nodes (link-scope), within a routing area (area-scope) or throughout an AS (AS-scope). While the conventional Router, Network, Summary and AS-External LSAs are constrained by their respective formats set forth in the OSPF protocol specification (RFC 2328), opaque LSAs are generally more flexible in what information they can transport. For instance, an opaque LSA may be configured to store one or more type-length-value (TLV) tuples containing selected OSPF attributes associated with routes advertised in the opaque LSA.

The Internet Draft publication <draft-mirtorabi-ospf-tag-01.txt>, entitled *Extensions to OSPFv2 for Advertising Optional Route/Link Attributes*, published August 2005 by S. Mirtorabi et al., which publication is publicly available through the IETF and is hereby incorporated by reference in its entirety, describes an OSPF Router Attributes (RA) Opaque LSA that may be used to transport at least one Inter-Area/External Route Attribute TLV (RA-TLV). The RA-TLV may contain one or more route attributes that are encoded as sub-TLVs within the RA-TLV. Currently, the RA-TLV is only used to transport sub-TLVs containing OSPF tags, extended tags and multi-topology identifiers associated with OSPF routes advertised in the RA-Opaque LSA.

PE-CE Network Topology

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN.

Network nodes belonging to the same VPN may be situated in different subnetworks, or "customer sites." Each customer site may participate in one or more different VPNs, although most often each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another.

The customer sites typically communicate with one another through a service provider network ("provider network"). The provider network is an AS that functions as a backbone network through which VPN information may be exchanged between customer sites. The provider network may include both provider edge (PE) devices which function as ASBRs at the logical outer edge of the provider network, as well as provider (P) devices situated within the interior ("core") of the provider network. Accordingly, each customer site contains at least one customer edge (CE) device coupled to a PE device in the provider network. The customer site may be multi-homed to the provider network, i.e., wherein one or more of the customer's CE devices is coupled to a plurality of PE devices. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc.

In a popular VPN deployment, provider networks often provide the customer sites with layer-3 network-based VPN services that utilize IP and/or Multi-Protocol Label Switching (MPLS) technologies. These networks are typically said to provide "MPLS/VPN" services. This widely-deployed MPLS/VPN architecture is generally described in more detail in the IETF publication RFC 2547, entitled *BGP/MPLS VPNs*, by E. Rosen et al., published March 1999, which is hereby incorporated by reference as though fully set forth herein.

Most typically, PE and CE devices are configured to exchange routing information over their respective PE-CE data links in accordance with the Border Gateway Protocol (BGP). The BGP protocol is well known and described in detail in RFC 1771 by Y. Rekhter and T. Li, entitled *A Border Gateway Protocol 4 (BGP-4)*, dated March 1995, which publication is hereby incorporated by reference as though fully set forth herein. A variation of the BGP protocol, known as internal BGP (iBGP), is often used to distribute routing and reachability information between PE devices in the provider network. To implement iBGP, the PE devices must be "fully meshed," such that each PE device is coupled to every other PE device, e.g., by way of a Transmission Control Protocol (TCP) connection. Those skilled in the art will understand that the fully-meshed PE devices may be directly connected or may be otherwise coupled, e.g., by one or more conventional BGP route reflectors.

BGP-enabled PE and CE devices perform various routing functions, including transmitting and receiving BGP messages and rendering routing decisions based on BGP routing policies. Each BGP-enabled device maintains a local BGP routing table that lists feasible routes to reachable (i.e., accessible) network nodes and subnetworks. The BGP table also may associate one or more BGP attributes with each route that it stores. For example, a conventional BGP AS-path attribute may be associated with a BGP route so as to identify a particular AS path that may be used for reaching that route. Typically, the AS path is represented as an ordered sequence of AS numbers corresponding to which ASes must be traversed in order to reach the route's associated node or subnetwork.

Although BGP is most often executed over PE-CE data links, other protocols also may be used to exchange routing and topology information between a customer-site CE device and a provider-network PE device. For instance, the Internet Draft publication <draft-ietf-l3vpn-ospf-2547-05.txt>, entitled *OSPF as the Provider/Customer Edge Protocol for BGP/MPLS IP VPNs*, published November 2005 by Rosen et al., which publication is publicly available through the IETF and is hereby incorporated by reference in its entirety, describes an implementation in which OSPF is executed over a PE-CE link. In this case, the PE device functions as an ABR for the customer site containing the CE device, and thus the PE device maintains both an OSPF LSDB containing the customer site's IGP topology information as well as a BGP table containing BGP routes that have been distributed, e.g., via iBGP, within the provider network.

Routing Loops

Routing protocols, such as OSPF and BGP, typically perform "best path" computations for selecting a preferred data path for transporting data to a destination node or subnetwork. Therefore, it is possible that two or more networks or subnetworks may select each other as the best path to reach a certain destination. In such a scenario, a "routing loop" can develop where data addressed to that destination is circulated among the two or more networks or subnetworks and may never actually reach its intended recipient. An example of a conventional routing loop is illustrated in FIG. 1.

FIG. 1 illustrates an exemplary network 100 including a provider network AS1 110 coupled to two customer sites 120 and 130 (labeled "A" and "B," respectively). Here, the customer sites A and B participate in the same VPN, e.g., VPN, and therefore communicate with one another through the provider network 110. As shown, the customer site 120 includes CE devices 125a and 125b (CE1 and CE2) which are coupled to respective PE devices 115a and 115b (PE1 and PE2) in the provider network. In addition, the customer site 130 includes a CE device 135c (CE3) which is coupled to a PE device 115c (PE3) in the provider network.

Suppose that CE3 advertises a message over the PE3-CE3 data link indicating that CE3 can reach the destination prefix "X." The advertised prefix is received by PE3, which in turn distributes the advertised prefix, e.g., in an iBGP update message, to the devices PE1 and PE2 in the provider network. After PE1 receives the iBGP advertisement, PE1 advertises the prefix X over the PE1-CE1 data link, thereby signaling to nodes in the customer site 120 that the prefix X can be reached via PE1. The prefix X is then distributed within the customer site 120 using an appropriate IGP protocol. CE2 may advertise over the PE2-CE2 data link that it can reach the prefix X. In response to receiving CE2's advertisement, PE2 may distribute this reachability information to the provider-edge devices PE1 and PE3. Although FIG. 1 illustrates the prefix X being advertised along the sequential data flow CE3-PE3-PE1-CE1-CE2-PE2-PE1, the prefix also may be advertised along a similar loop (not shown) CE3-PE3-PE2-CE2-CE1-PE1-PE2.

As a result of the above-noted advertisements, network nodes in the customer site 120 become aware that the prefix X is reachable through PE1, and PE1 becomes aware that the prefix X can be reached via PE2 or PE3. In this case, a routing loop may develop if the best-path calculations performed at PE1 determine that data addressed to the destination prefix X should be routed to the customer site 120 via PE2, instead of correctly routing the data through PE3 to the customer site 130. Thus, the data addressed to the prefix X may be passed back and forth between AS1 and the customer site 120, e.g., around the routing loop CE1-PE1-PE2-CE2-CE1.

One solution for preventing routing loops where OSPF is executed over the PE-CE data links is described in the above-incorporated Internet Draft publication <draft-ietf-l3vpn-ospf-2547-05.txt>, entitled *OSPF as the Provider/Customer Edge Protocol for BGP/MPLS IP VPNs*. This proposed solution relies on an OSPF route tag for identifying when one or more advertised routes have already been advertised from a PE device to a CE device. Accordingly, when an LSA containing an advertised route and a corresponding OSPF route tag is received at a PE device, that PE device can identify the route tag and determine that the received route was previously advertised by a PE device in the provider network. Based on this determination, the PE device can conclude that the received route should not be propagated again through the provider network.

This known OSPF route-tag solution suffers the disadvantage that it is not applicable when Summary LSAs are exchanged over PE-CE data links. More specifically, Summary LSAs are not formatted in a manner that enables them to transport the OSPF route tags. Instead, the route tags are typically transported in AS-External LSAs which carry external routing information. Thus, this solution is generally undesirable since it precludes the use of Summary LSAs for advertising internal routes over PE-CE links and therefore does not permit conventional route aggregation techniques that are traditionally employed for reducing the number of routes processed in an OSPF routing area. Also, as will be understood by those skilled in the art, the OSPF external route tag solution does not apply to multi-homed networks.

Yet another solution for preventing routing loops where OSPF is executed over the PE-CE data links is described in the Internet Draft publication <draft-ietf-ospf-2547-dnbit-04.txt>, entitled *Using an LSA Options Bit to Prevent Looping in BGP/MPLS IP VPNs*, published March 2004 by Rosen et al., which publication is publicly available through the IETF and is hereby incorporated by reference as though fully set forth herein. This solution proposes using the most-significant bit, i.e., the "DN" bit, in the conventional LSA-options field to indicate when an OSPF LSA has been advertised from a PE device to a CE device. Because every LSA transports the LSA-options field, this DN-bit solution is not limited to only AS-External LSAs. When a PE device receives an LSA whose DN bit is "set," the routing information transported in the received LSA is excluded from the PE device's SPF calculation (e.g., the LSAs are not stored in the OSPF LSDB). As such, the LSA's advertised routes are not installed in the PE device's routing table. In this way, the uninstalled routes are not redistributed into the provider network's BGP tables, thereby ensuring that routing loops cannot develop between the provider network and the customer site containing the CE device.

FIG. 2 illustrates the exemplary network 100 in which the DN-bit solution is deployed for preventing routing loops. First, CE3 advertises the prefix X over the PE3-CE3 data link. The advertised prefix X is received by PE3, which in turn advertises the prefix, e.g., in an iBGP update message, to the devices PE1 and PE2. After PE1 receives the iBGP advertisement, PE1 advertises a conventional OSPF LSA containing the prefix X over the PE1-CE1 data link. However, according to this DN-bit solution, PE1 sets the DN-bit in the advertised LSA to indicate that the prefix X is reachable through the provider network. The LSA, with its DN bit set, is distributed throughout the customer site 120. CE2 may forward the LSA back to the provider network 110 over the PE2-CE2 link. However, because the DN-bit is set in the LSA, PE2 can determine that the LSA was generated by another PE device (PE1) in the provider network. Upon making this determination, PE2 does not install the prefix X in its routing table, thereby preventing any potential routing loops from developing between the customer site 120 and the provider network 110. That is, network nodes in customer site 120 are aware that prefix X can be reached via PE1, and PE1 is only aware that prefix X can be reached via PE3.

Although this conventional DN-bit solution for preventing routing loops works well in many network topologies, it may suffer various problems in topologies having multiple provider networks (ASes) that are not configured to directly communicate with one another, e.g., because of contractual terms or lack of network connectivity. For instance, consider the exemplary network 300 shown in FIG. 3. Here, the provider network AS1 310 is coupled to the customer sites 330, 340 and 350 (labeled "A," "B" and "C" respectively) which participate in the same VPN, e.g., VPN1. In addition, the customer sites 340 and 350 are also coupled to a second provider network AS2 320. In this case, the provider network AS1 may function as a primary Internet service provider (ISP), whereas the provider network AS2 functions as a backup ISP through which the customer sites 330-350 may communicate in the event that a PE-CE link to AS1 fails. Notably, AS1 and AS2 are not configured to communicate directly with one another.

As shown, the customer site 330 includes a CE device 335a (CE1) which is coupled to a PE device 315a (PE1) located in AS1. In addition, AS1 also includes a PE device 315b (PE2) coupled to a CE device 345b (CE2) situated in the customer site 340, as well as to a PE device 315c (PE3) coupled to a CE device 355c (CE3) located in the customer site 350. Also, a CE device 345d (CE4) in the customer site 340 is coupled to a PE device 325d (PE4) in AS2, and a CE device 355e (CE5) in the customer site 350 is coupled to a PE device 325e (PE5) in AS2. Further assume that each of the PE-CE data links is configured to execute OSPF.

In this illustrative topology, CE1 may advertise to PE1 that the prefix X can be reached via CEC. In response, PE1 propagates the prefix X, e.g., in iBGP update messages, to the devices PE2 and PE3. Next, PE2 and PE3 each may advertise an LSA containing the prefix X to the customer-edge devices CE2 and CE3. In accordance with the conventional DN-bit technique, the LSAs advertised over the PE2-CE2 and PE3-CE3 data links have their DN bits set to a predetermined value so as to indicate that the prefix X is reachable through a PE device. When the LSAs are forwarded over the PE4-CE4 and PE5-CE5 data links, the provider-edge devices PE4 and PE5 notice that the DN bits are set in the received LSAs and, consequently, exclude the prefix X from their OSPF and BGP routing tables. As a result, the customer sites 340 and 350 do not learn that the prefix X can be reached via the ISP AS2. In other words, the backup connectivity of AS2 is "broken" for the backup ISP AS2, since the customer sites 340 and 350 are only made aware that the prefix X can be reached through the primary ISP AS1.

For example, in the event that the PE2-CE2 link fails, the customer site 340 is not aware that the prefix X can alternatively be reached through AS2, e.g., via the backup data path CE4-PE4-PE5-CE5-CE3-PE3-PE1-CE1. Similarly, if the PE3-CE3 data link fails, the customer site 350 is not aware that the prefix X can be reached through AS2, e.g., via the backup data path CE5-PE5-PE4-CE4-CE2-PE2-PE1-CE1.

In networks having multiple provider networks that are not configured to communicate with one another, as shown in FIG. 3, it is generally desirable to implement a routing-loop prevention technique that does not break the backup connectivity of the topology. The technique should not be limited to AS-External LSAs sent over PE-CE links and instead should be operable with any type of OSPF LSA sent over a PE-CE data link.

SUMMARY OF THE INVENTION

The present invention overcomes the disadvantages of the prior art by providing a novel technique for preventing routing loops by disseminating BGP attribute information in an OSPF-configured network. Specifically, a new OSPF sub-TLV is introduced for transporting a conventional BGP AS-path attribute through the OSPF-configured network. Like the BGP AS-path attribute, an OSPF AS-path sub-TLV is configured to store a set of AS numbers corresponding to the AS path of one or more advertised routes. When a network device receives an OSPF LSA containing the novel AS-path sub-TLV, the network device determines whether it resides in an autonomous system whose AS number is stored in the received sub-TLV. If so, the network device determines that the LSA's advertised routes have been previously advertised to the autonomous system, and thus the network device does not install the routes in its routing table since the routes, if installed, could create routing loops between autonomous systems. However, if the network device determines that the AS number of its autonomous system is not stored in the received AS-path sub-TLV, the network device may install the LSA's advertised routes in its routing table and then propagate the routes to other autonomous systems. In this case, the routes may be propagated along with an updated AS-path sub-TLV that stores an AS path including the AS number of the network device's autonomous system. In this manner, the LSA's advertised routes can be propagated across multiple autonomous systems without creating routing loops as a result of their propagation.

Advantageously, the novel AS-path sub-TLV may be used to prevent routing loops without breaking backup connectivity in networks having multiple autonomous systems that are not configured to communicate with one another. For instance, unlike prior implementations, the inventive technique can prevent routing loops from developing when a route is advertised from a first customer site to a primary AS to a second customer site and then to a secondary ("backup") AS which is not in communication with the primary AS. More generally, the technique may be deployed to prevent routing loops in single-AS as well as multi-AS environments. Further, the inventive technique may be used to prevent routing loops for both internal and external routes advertised in an OSPF routing area.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 4:
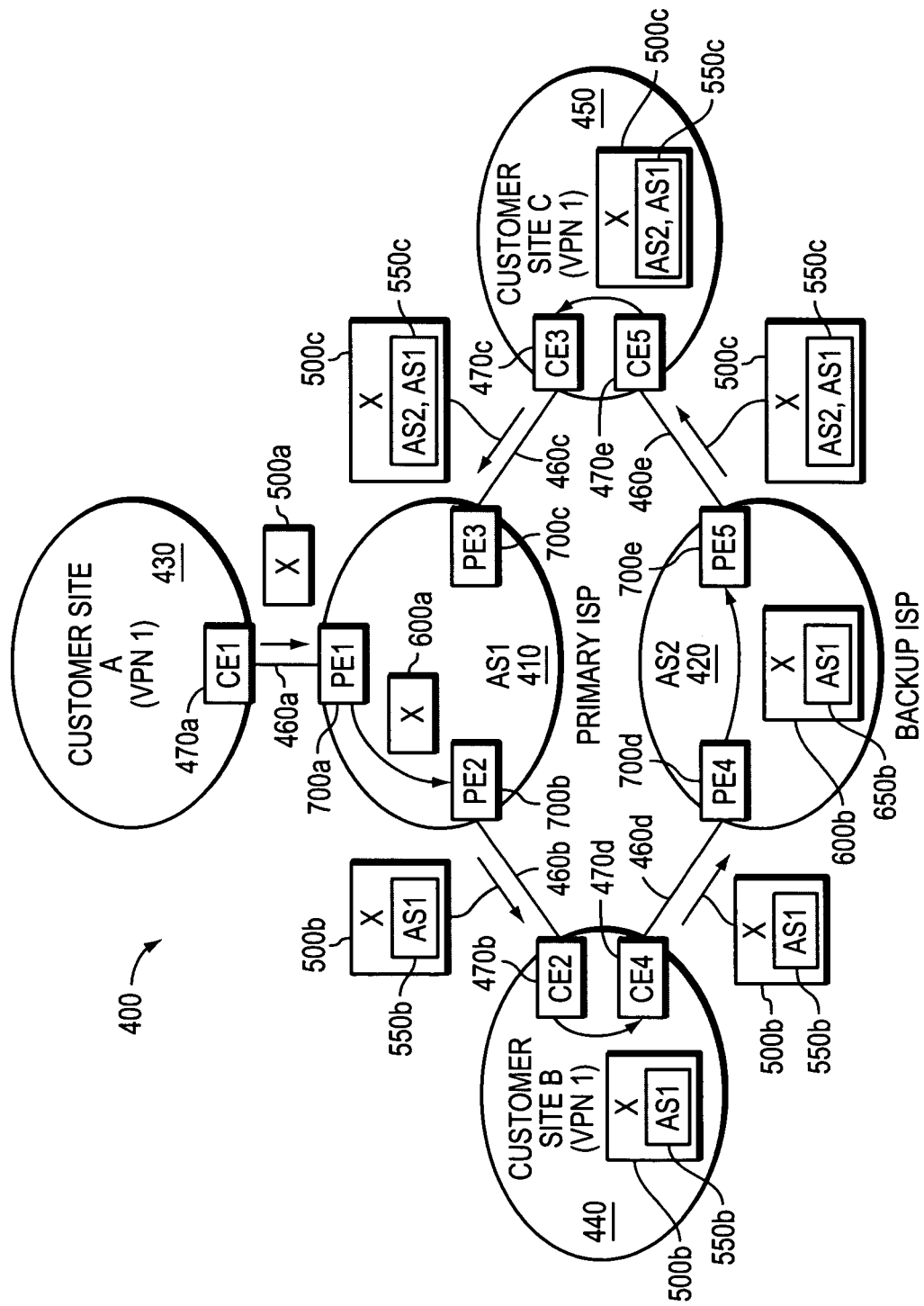
FIG. 4 is an exemplary computer network in which an illustrative embodiment of the present invention may be advantageously deployed for preventing routing loops.

FIG. 4 illustrates an exemplary computer network 400 in which an illustrative embodiment of the present invention may be deployed. The network 400 includes a first provider network AS1 410 and a second provider network AS2 420. The provider networks AS1 and AS2 are not configured to directly communicate with one another, e.g., due to contractual agreement or lack of connectivity. The exemplary network 400 also includes a set of customer sites 430, 440 and 450 (labeled "A," "B" and "C" respectively) which participate in the same VPN, e.g., VPN1. Each of the customer sites 430-450 is coupled to AS1, which functions as a "primary" ISP for exchanging data among the VPN1 customer sites. In addition, the customer sites 440 and 450 are also coupled to AS2, which functions as a "backup" ISP in the event that a PE-CE link to AS1 fails.

As shown, the customer site 430 includes a CE device 470a (CE1) which is coupled to a PE device 700a (PE1) located in AS1. In addition, AS1 also includes a PE device 700b (PE2) coupled to a CE device 470b (CE2) situated in the customer site 440, as well as to a PE device 700c (PE3) coupled to a CE device 470c (CE3) located in the customer site 450. Also, a CE device 470d (CE4) in the customer site 440 is coupled to a PE device 700d (PE4) in AS2, and a CE device 470e (CE5) in the customer site 350 is coupled to a PE device 700e (PE5) in AS2. Each of the data links PE1-CE1 460a, PE2-CE2 460b, PE3-CE3 460c, PE4-CE4 460d and PE5-CE5 460e is preferably configured to accommodate execution of the OSPF protocol, and each of the devices PE1-PE5 functions as an ABR device for its respective neighboring OSPF-configured customer site 430-450.

In this illustrative topology, CE1 may advertise an OSPF LSA 500a to PE1 indicating that the prefix X can be reached via CE1. In response, PE1 propagates the prefix X, e.g., in iBGP update messages (hereinafter "BGP update message"), to the other fully-meshed devices PE2 and PE3. The BGP update messages may be sent directly to PE2 and PE3, or may be forwarded using a conventional route reflector, as is known in the art. For simplicity of illustration and explanation, only the BGP update message 600a is shown forwarded to PE2. After receiving the message 600a, PE2 may notify CE2 that the prefix X can be reached through PE2. To that end, PE2 may forward the prefix X in an OSPF LSA 500b to CE2.

Unlike prior implementations, PE2 may be configured to store BGP path-attribute information, such as AS-path information, in the LSA 500b. The AS-path information may be used to prevent routing loops in accordance with the present invention. More particularly, the LSA 500b includes a novel OSPF sub-TLV 550b that is configured to store a conventional BGP AS-path attribute over the OSPF-configured PE2-CE2 data link 460b. Like a conventional BGP AS-path attribute, the OSPF AS-path sub-TLV is configured to store a set of AS numbers corresponding to the AS path of one or more advertised routes. Accordingly, in this case, the sub-TLV 550b stores the AS number of provider network AS1, since the LSA 500b is being advertised by PE2, which is resident in AS1.

CE2 receives the LSA 500b from PE2 and disseminates the LSA throughout the OSPF-configured customer site 440. Notably, the customer site 440 may contain one or more routing areas through which the LSA 500b may be propagated. When CE4 receives the LSA 500b, it forwards the LSA over the PE4-CE4 data link 460d to PE4 situated in AS2. In accordance with the illustrative embodiment, PE4 is configured to advertise the prefix X and its associated AS-path information to other PE devices in AS2, as long as the AS number of AS2 is not included in the prefix's AS path. In this case, the AS-path sub-TLV 550b indicates that the AS path for the prefix X includes only AS1, and therefore the sub-TLV does not store the AS number of the provider network AS2 in which PE4 is located. Since the AS number of AS2 is not stored in the received AS-path sub-TLV 550b, PE4 advertises the prefix X in a BGP update message 600b, along with a conventional BGP AS-path attribute 650b, to the other fully-meshed PE devices in the provider network AS2. The BGP attribute 650b stores the same list of AS numbers received in the AS-path sub-TLV 550b, and thus stores only the AS number of AS1.

In response to receiving the BGP update message 600b, PE5 may store the prefix X and its AS-path information in an OSPF LSA 500c and send the LSA 500c to the customer-edge device CE5, thereby signaling to CE5 that the prefix X is reachable through PE5. Accordingly, PE5 includes a novel AS-path sub-TLV 550c in the LSA 500c, the AS-path sub-TLV 550c storing the AS path associated with the advertised prefix X. Preferably, PE5 generates the AS-path sub-TLV 550c by prepending the AS number of provider network AS2 to the list of AS numbers already stored in the received BGP AS-path attribute 650b. Thus, in this example, the sub-TLV

550c transports the ordered sequence of AS numbers {AS2, AS1}. Of course, those skilled in the art will understand that the AS numbers need not be sequentially prepended as illustratively described herein, and more generally the set of AS numbers may be listed in the AS-path sub-TLV in various sequential or non-sequential manners.

After receiving the OSPF LSA 500c, CE5 disseminates the LSA 500c throughout the customer site 450. CE3 receives the LSA 500c and forwards it over the PE3-CE3 data link 460c to PE3. In accordance with the illustrative embodiment, PE3 determines whether the received AS-path sub-TLV 550c includes the AS number corresponding to AS1, i.e., the provider network in which PE3 is located. In this case, because the AS-path sub-TLV 550c contains the AS number of AS1, PE3 determines that the prefix X (transported by the LSA 500c) was previously advertised throughout the provider network AS1. Consequently, PE3 does not install the prefix X in its routing table so as to prevent potential routing loops from developing in the network 400. Although the above-described data flow is described in terms of CE1-PE1-PE2-CE2-CE4-PE4-PE5-CE5-CE3-PE3, those skilled in the art will appreciate that PE2 similarly may identify a potential routing loop in accordance with the present invention, if PE2 receives the prefix X and an AS-path sub-TLV containing the AS number of AS1, where the data flow is CE1-PE1-PE3-CE3-CE5-PE5-PE4-CE4-CE2-PE2.

Figure 1:
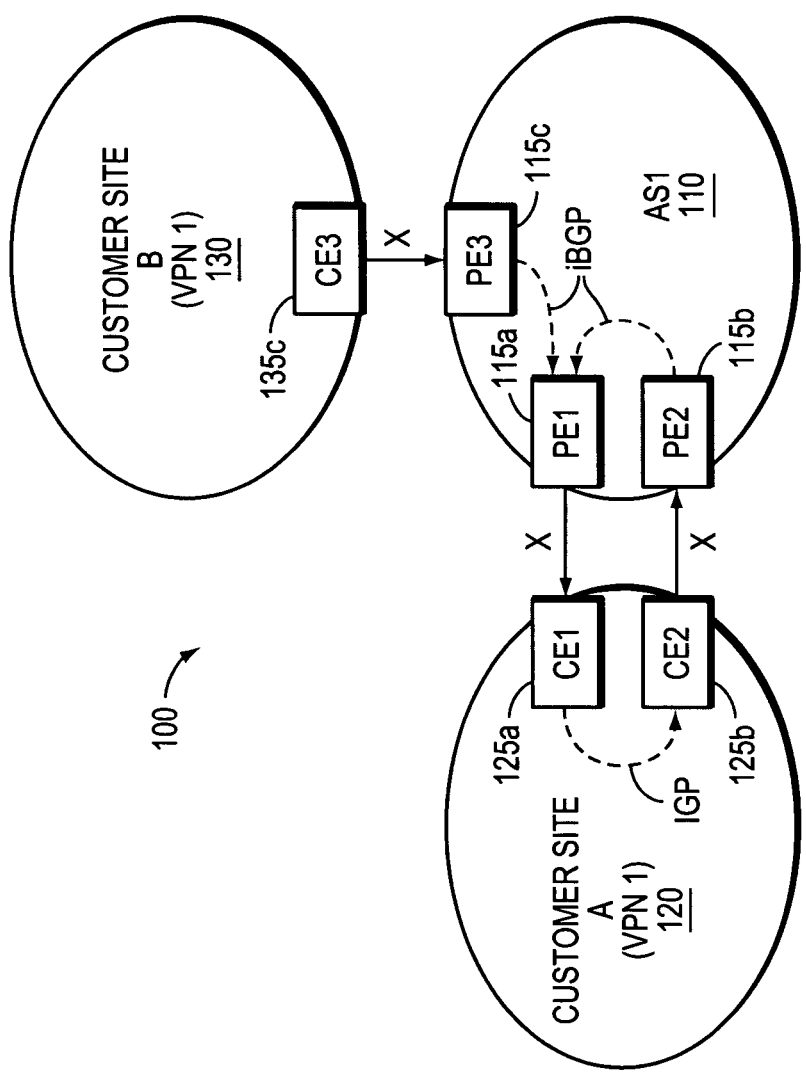
FIG. 1, previously described, is an exemplary computer network in which routing loops may develop.
Figure 2:
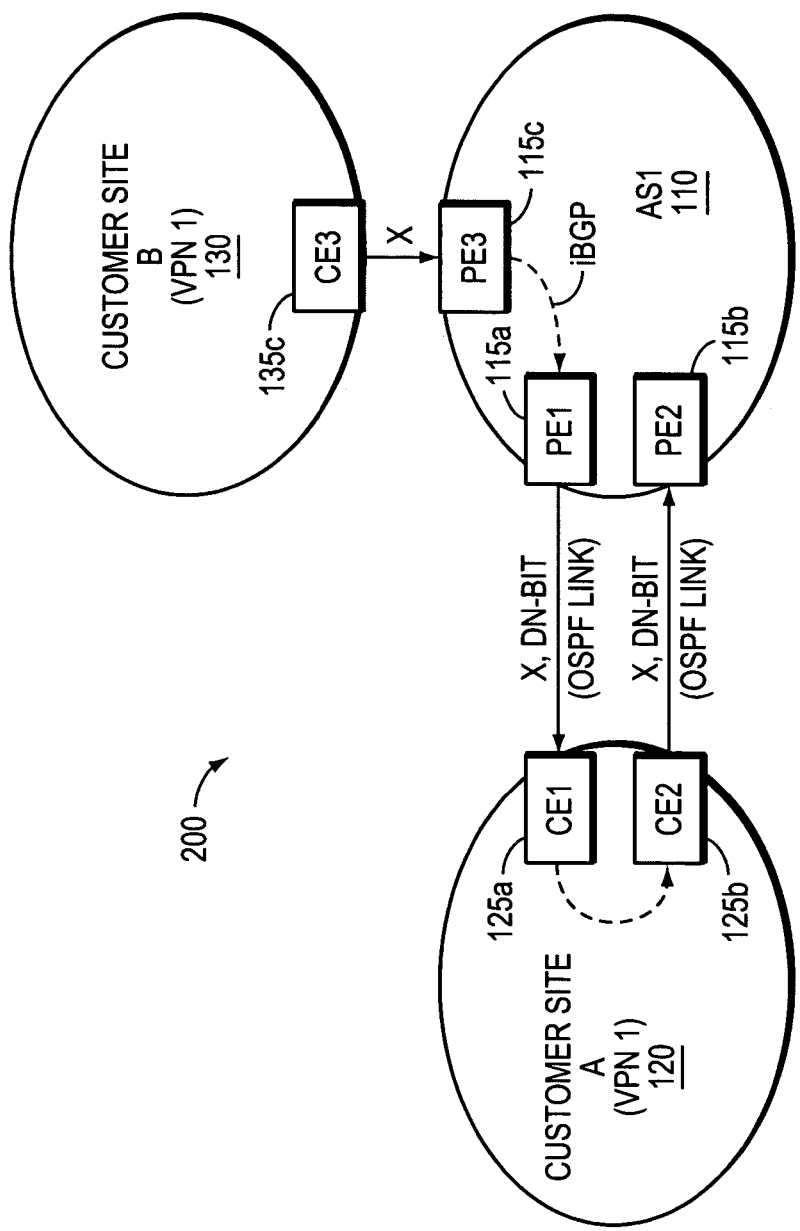
FIG. 2, previously described, is an exemplary computer network configured to execute the OSPF protocol over PE-CE data links, wherein a DN-bit solution is deployed over the PE-CE data links for preventing routing loops.
Figure 3:
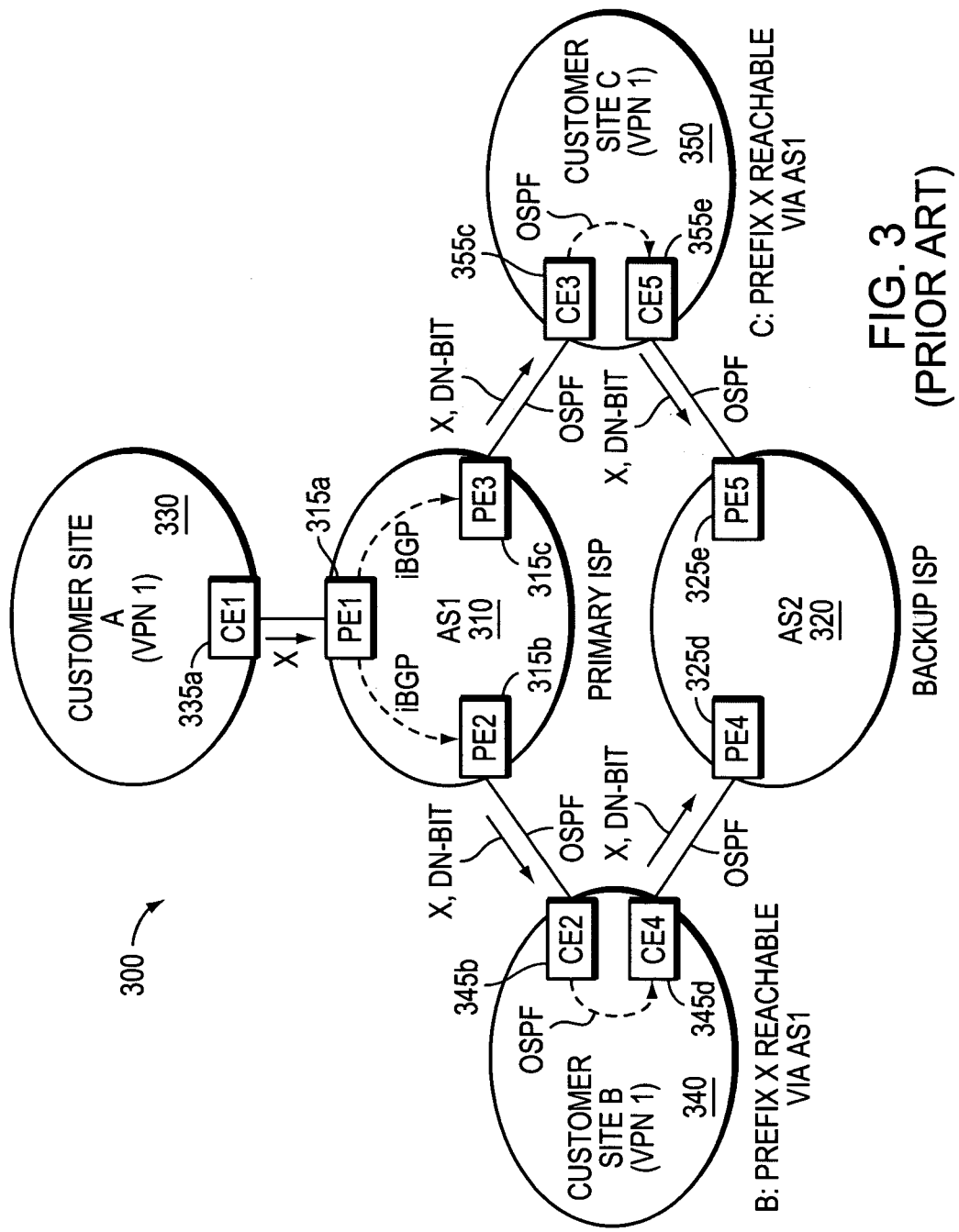
FIG. 3, previously described, is an exemplary network topology in which the conventional DN-bit solution does not effectively prevent routing loops, the topology including multiple provider networks that are not configured to directly communicate with one another.

Notably, the present invention may be used in conjunction with the DN bit as described above with reference to FIG. 2 and FIG. 3. In particular, the DN bit prevents routing loops from occurring by excluding from SPF calculations any advertised prefixes received with a DN bit set by an egress border router (e.g., PE device). As mentioned above, one problem with this solution is that unnecessary exclusions may occur in various network configurations, such as, e.g., the backup service provider configuration of FIG. 3 and FIG. 4. By continuing to utilize the DN bit, the present invention "improves" the DN bit behavior by allowing the PE devices receiving DN bit LSAs prior to the AS-path sub-TLV 550 LSAs 500 to exclude (perhaps unnecessarily) one or more reachable address prefixes (e.g., prefix X). Once an AS-path sub-TLV 550 LSA 500 is received, however, the decision to exclude/include the prefix (X) in its routing table based on the AS-path sub-TLV overrides any decisions based on the DN bit. In other words, if the DN bit exclusion is proper, no changes are made, but if it is improper, the prefix may be added accordingly.

Figure 5:
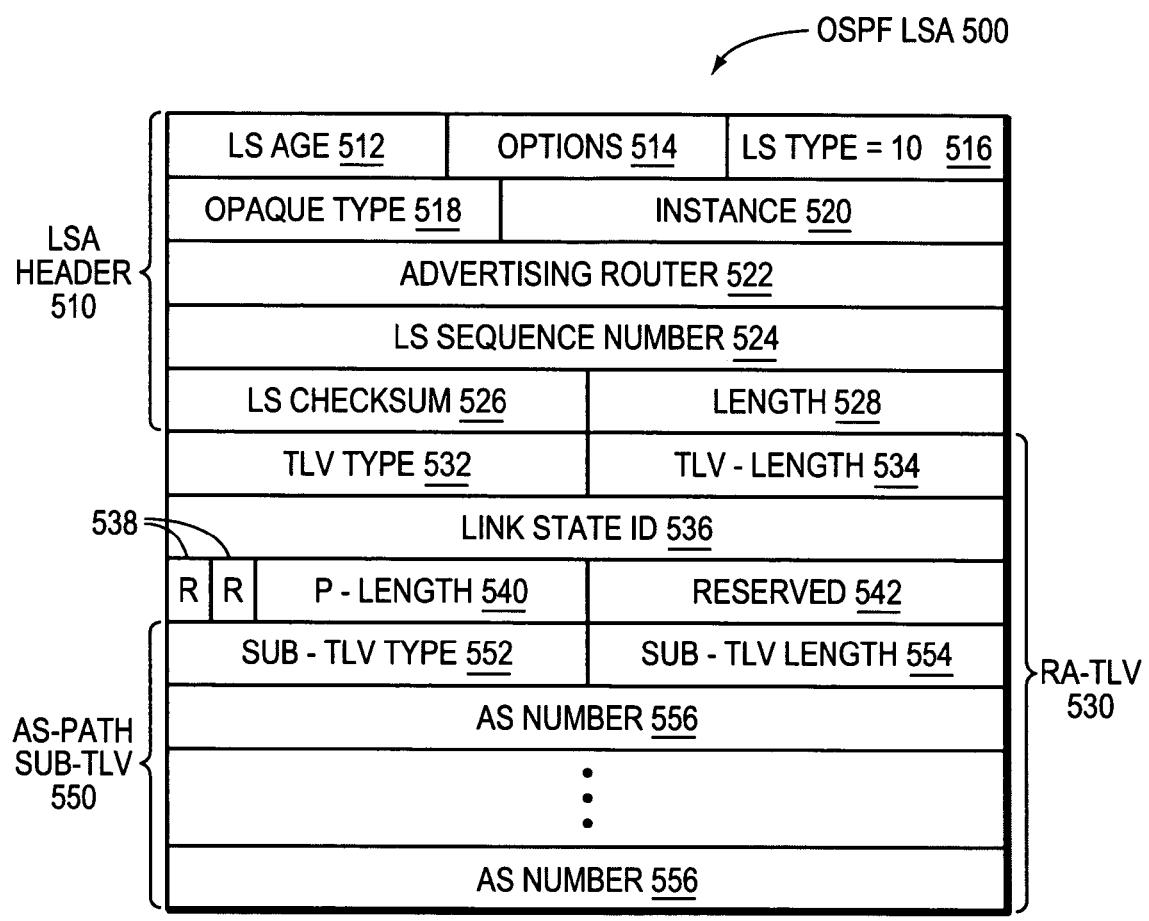
FIG. 5 is an exemplary OSPF LSA that may be used to transport, among other things, a novel AS-path sub-TLV in accordance with the illustrative embodiment.

FIG. 5 illustrates an exemplary OSPF LSA 500 that may be used to transport the novel AS-path sub-TLV 550 in accordance with the illustrative embodiment. The LSA is 500 may be formatted as a type-10 opaque LSA, which is defined in the above-incorporated RFC 2370, entitled *The OSPF Opaque LSA Option*. The opaque LSA 500 includes, among other things, an LSA header 510 and one or more TLVs, such as a RA-TLV 530 described in more detail in the above-incorporated IETF Internet Draft publication <draft-mirtorabi-ospf-tag-01.txt, entitled *Extensions to OSPFv2 for Advertising Optional Route/Link Attributes*. The LSA 500 also may store link-state information and other TLVs which are not explicitly shown in FIG. 5. Those skilled in the art will understand that while a type-10 opaque LSA is described herein, other types may be used in accordance with the present invention.

The LSA header 510 includes a link-state (LS) age field 512, an LSA options field 514, an LS type field 516, an opaque-type field 518, an instance field 520, an advertising-router field 522, a LS sequence number field 524, a LS checksum field 526 and a length field 528. The LS age field 512 stores an age value, e.g., usually in seconds, that may be used to determine whether the LSA 500 is valid. The age value is typically initialized to zero and incremented, e.g., by one every second, until it reaches a predetermined maximum value, thereby indicating that the LSA has become invalid. The options field 514 stores a plurality of flag values that may be used to signal whether certain capabilities are supported by the LSA's advertising router. For instance, one flag may indicate whether the advertising router is configured to receive and forward opaque LSAs.

The type field 516 equals 10 to indicate that the LSA 500 has area-wide scope, and therefore cannot be flooded beyond the routing area into which it is initially flooded. The opaque-type field 518 stores a value that identifies the LSA 500 as a label-mapping LSA. If multiple instances of OSPF are executing over the same data link 460, the instance field 520 stores a value that identifies the particular OSPF instance for which the LSA 500 transports link-state information. The advertising-router field 522 stores a value, such as a loopback IP address, that identifies the router that generated and originally broadcast the LSA 500. The LS sequence number field 524 stores a sequence number indicating the relative version of the LSA. Typically, the sequence number is incremented, e.g., by one, for every new version of the LSA. The LS checksum field 526 stores a checksum (or other data integrity check) that may be used to validate the contents of the LSA. The length field 528 stores the length, e.g., in bytes, of the LSA 500.

The RA-TLV 530 includes, among other things, a TLV-type field 532, TLV-length field 534, link-state identification (ID) field 536, reserved bits 538, prefix-length field 540, reserved field 542 and the AS-path sub-TLV 550. The TLV-type field 532 stores a value indicating the type of route-attribute information (e.g., inter-area or external route attributes) that is stored in the RA-TLV 530. The TLV-length field 534 stores the length (e.g., in bytes) of the RA-TLV. The link-state ID field 536 stores the address prefix of a data link associated with the route attributes transported in the RA-TLV. The prefix-length field 540 stores the length of the prefix stored in the link-state ID field 536. The reserved bits 538 and reserved field 542 are presently unused.

The RA-TLV 530 may be configured to store one or more sub-TLVs, such as the novel AS-path sub-TLV 550. Although the AS-path sub-TLV 550 is preferably formatted as a sub-TLV within the RA-TLV 530, it is also expressly contemplated that the AS-path sub-TLV alternatively may be formatted as a sub-TLV in other types of OSPF TLVS. Further, in some embodiments, the AS-path sub-TLV may be formatted as an actual TLV rather than a sub-TLV. The AS-path sub-TLV 550 is configured to store, inter alia, a sub-TLV type field 552, sub-TLV length field 554 and a list of one or more AS numbers 556. The sub-TLV type field 552 stores a value that identifies the AS-path sub-TLV as containing AS-path information. The sub-TLV length field 554 stores the length (e.g., in bytes) of the AS-path sub-TLV 550. The list of AS numbers 556 indicates an AS path associated with the address prefix stored in the link-state ID field 536. Notably, the list is preferably an ordered sequence of AS numbers 556, although the list alternatively may be configured to store an unordered list, depending on the particular implementation.

Figure 6:
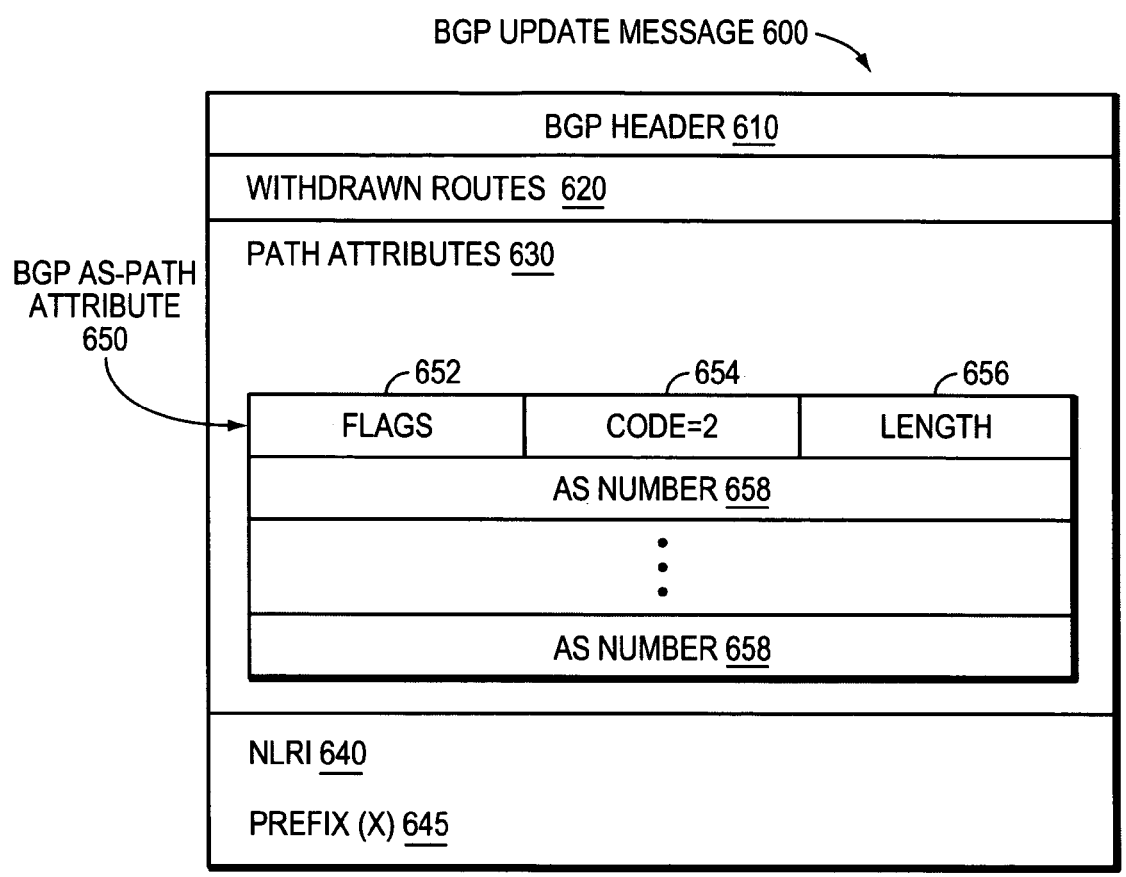
FIG. 6 is an exemplary BGP update message that may be used to transport, among other things, a BGP AS-path attribute in accordance with the illustrative embodiment.

FIG. 6 illustrates an exemplary BGP update message 600 that may be used in accordance with the illustrative embodiment. The update message 600 includes a BGP header 610, a set of withdrawn routes 620, a set of path attributes 630 and a set of network layer reachability information (NLRI) 640. The BGP header 610 may be configured to store, among other things, the length (in bytes) of the message 600, a type value (e.g., equal to 2) identifying the message as a BGP update message and a conventional is 16-byte BGP marker, as known in the art. The set of withdrawn routes 620 is configured to store zero or more address prefixes that are no longer reachable through a sending PE device. For instance, a PE device may withdraw a set of routes in response to a topology change, such as a failed data link or network node, that results in network traffic becoming inaccessible over the withdrawn routes. In contrast, the NLRI 640 specifies zero or more address prefixes that are reachable (i.e., accessible) to the sending PE device. For instance, in the exemplary update message 600, the NLRI stores the prefix X 645.

The set of path attributes 630 is configured to store zero or more BGP attributes that characterize the prefixes stored in the NLRI 640. In this context, a path attribute is generally any property or characteristic that may be associated with the NLRI prefix(es). For example, the set of path attributes may include an AS-path attribute 650 that carries AS-path information associated with the prefix(es) stored in the NLRI. The AS-path attribute 650 includes a set of attribute flags 652, a code field 654, length field 656 and a list of one or more AS numbers 658. The set of attribute flags 652 are well known and are described in more detail in the above-incorporated RFC 1771. The code field 654 stores a value that identifies the BGP attribute as containing AS-path information. The length field 656 stores the length (e.g., in bytes) of the attribute 650. The list of AS numbers 658 may contain an ordered or unordered set of AS numbers describing the AS path of the prefixes stored in the NLRI 640. Notably, other BGP path attributes and their formats are also generally well known and are further described in more detail in the above-incorporated RFC 1771.

Figure 7:
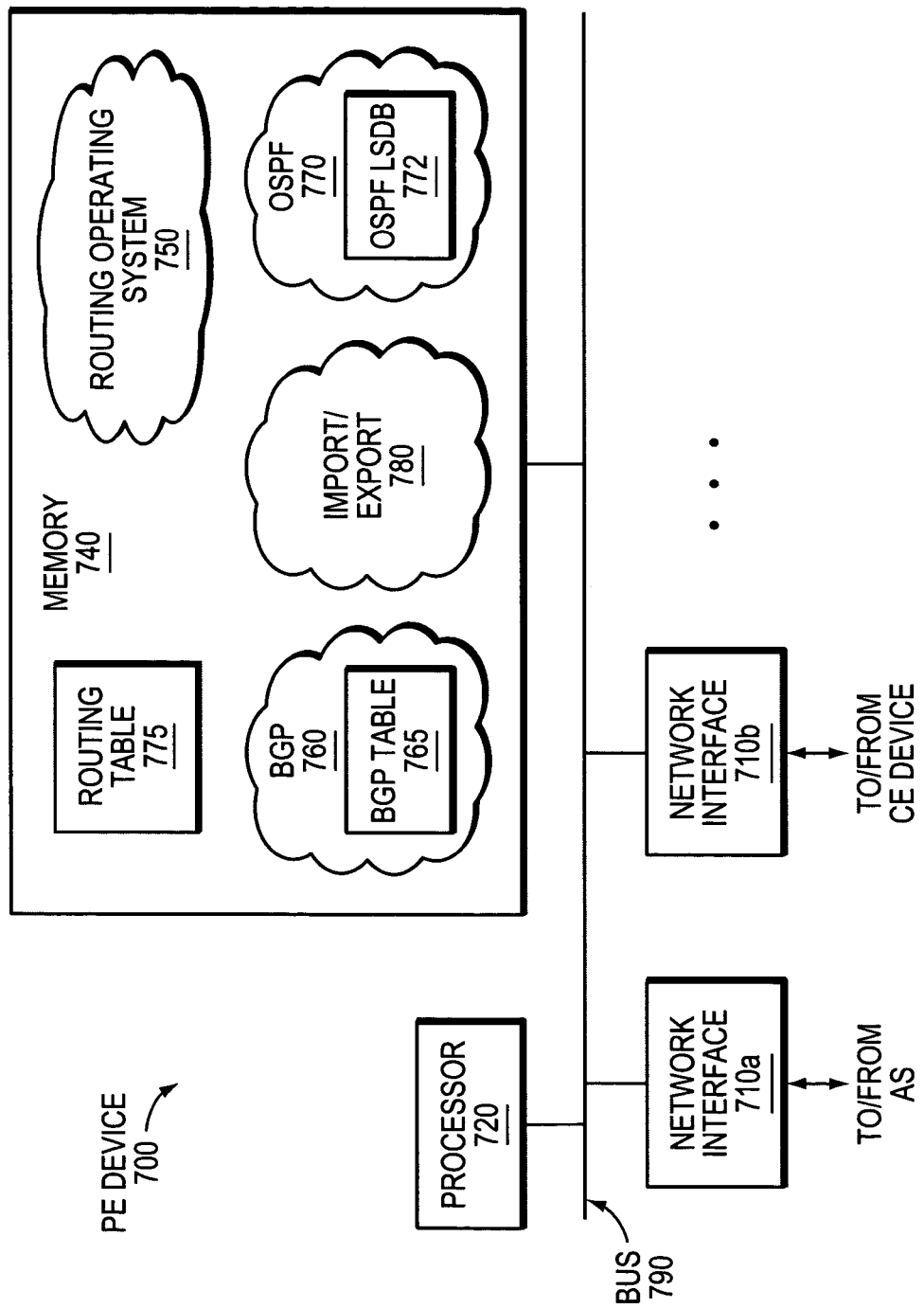
FIG. 7 is a schematic block diagram of an exemplary PE device that may be advantageously employed in the illustrative embodiment of the invention.

FIG. 7 is a schematic block diagram of an exemplary PE device 700 that may be advantageously used in the illustrative embodiment. For ease of illustration and description, the PE device 700 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device is merely exemplary and that the advantages of the present invention may be realized on a variety of different hardware platforms having various software capabilities.

The PE device 700 comprises a plurality of network interfaces 710, a processor 720, and a memory 740 interconnected by a system bus 790. The network interfaces 710 contain the mechanical, electrical and signaling logic and circuitry for communicating data over physical links coupled to other network nodes in the computer network 400. The network interfaces may be configured to transmit and/or receive data using a variety of different communication protocols, including, inter alia, TCP/IP, Asynchronous Transfer Mode (ATM), User Datagram Protocol (UDP), synchronous optical networks (SONET), synchronous digital hierarchy (SDH), various wireless protocols, Frame Relay, Ethernet, Fiber Distributed Data Interface (FDDI), etc.

The memory 740 comprises a plurality of storage locations, which are addressable by the processor 720 and the network interfaces 710. The memory storage locations are adapted to store program code and data structures associated with the present invention. The processor 720 comprises circuitry and logic adapted to execute the program code and manipulate the data structures.

The memory 740 preferably comprises a form of random access memory (RAM) that is generally cleared by a power cycle or other reboot operation (e.g., it is a "volatile"memory). It will be apparent to those skilled in the art that the memory 740 also may comprise other memory means, including various computer-readable media, for storing program instructions and data structures pertaining to the operation of the PE device 700. Further, those skilled in the art will appreciate that at least some portions of the memory 740 may be embodied as electromagnetic signals that are transmitted from a remote memory element to the PE device 700.

The memory 740 stores, among other things, computer-readable instructions for implementing a routing operating system 750 that functionally organizes the PE device 700 by, inter alia, invoking network operations in support of software processes and services executing in the PE device. The IOS™ operating system by Cisco Systems Incorporated is one example of such a routing operating system 750. The software processes and services supported by the routing operating system include a BGP process 760, an OSPF process 770, and an import/export process 780 (e.g., illustratively performed in conjunction with routing tables 775, as will be understood by those skilled in the art). The BGP process includes computer-executable instructions that enable the processor 720 to implement external BGP (eBGP) and internal BGP (iBGP) functionality. The BGP process 760 may be configured to manage the contents of a BGP table 765, which lists all of the feasible routes that are reachable (i.e., accessible) to the PE device 700 through neighboring customer sites. Again, a BGP "route" includes an address prefix and its associated BGP path attributes.

The PE device 700 may execute a separate OSPF process 770 for each VPN to which it is attached. For simplicity, each of the illustrative customer sites 430-450 participates in the same VPN, e.g., VPN1. Accordingly, each of the illustrative PE devices 700*a-e* executes only a single OSPF process 770 for managing reachability information in the VPN1. The OSPF process 770 may be configured to manage an LSDB 772 which contains link-state information, e.g., for the VPN1. More specifically, the LSDB may be configured to store a set of destinations (nodes, networks or subnetworks) which are reachable in the VPN and further may be configured to store conventional OSPF cost metrics that are associated with the data links to the reachable destinations. In addition, for each reachable destination, the LSDB 772 also may be configured to store one or more associated OSPF TLVs or sub-TLVs, such as an AS-path sub-TLV 550.

Figure 8:
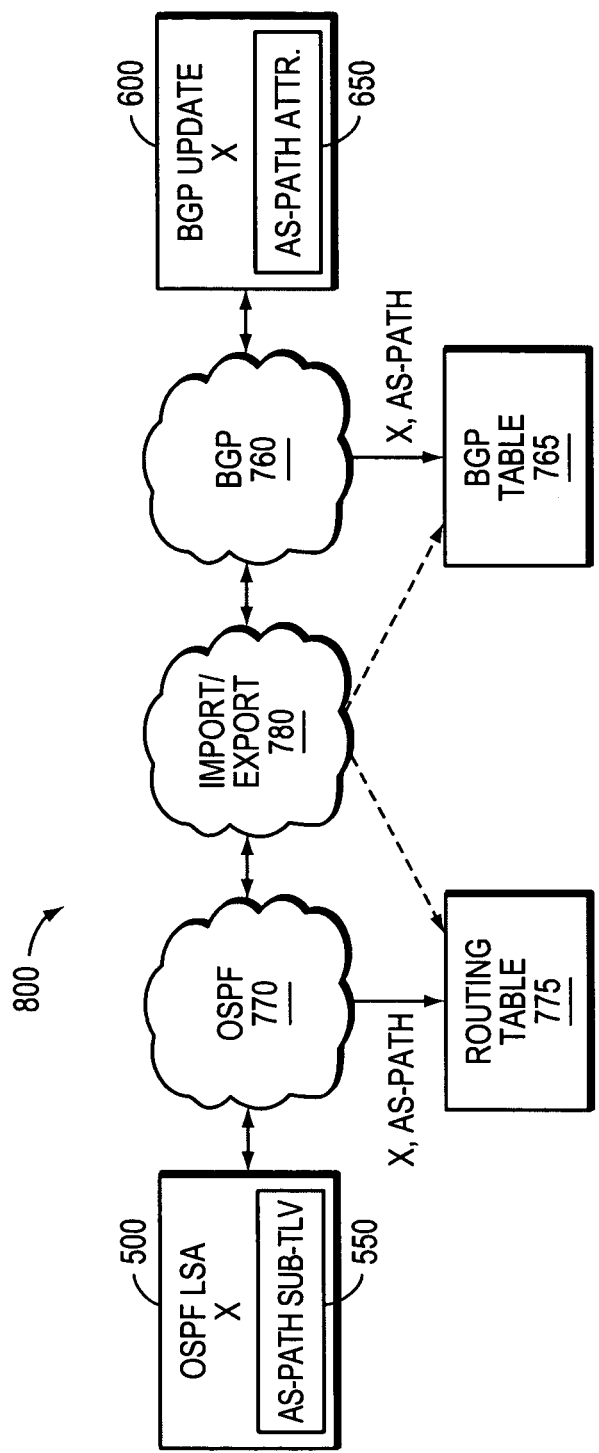
FIG. 8 is a schematic block diagram illustrating an exemplary software process arrangement that the exemplary PE device may use to redistribute routes and AS-path information between the OSPF and BGP protocols in accordance with the illustrative embodiment.

FIG. 8 illustrates a schematic block diagram of the exemplary process arrangement 800 that may be used to redistribute routes between the routing table 775 and the BGP table 765. For example, when an OSPF LSA 500 is received at the PE device 700, the OSPF process 770 stores the LSA's advertised prefix(es), e.g., prefix X, in appropriate entries in the LSDB 772. The OSPF process 770 also stores in the LSDB any OSPF cost metrics or other link-state information, such as the AS-path sub-TLV 550, received in the LSA 500. After installing the advertised OSPF routes in the LSDB 772, the OSPF process 770 may perform a shortest-path-first (SPF) computation to calculate the best paths, e.g., lowest cost paths, to reachable destinations in the VPN1, which are stored in routing table 775. In this context, each "best path" is a route that identifies a preferred data path to a reachable destination. Notably, storing prefixes and AS-path information in an LSDB and storing routes in a routing table may be used interchangeably herein due to their interrelationship, as will be understood by those skilled in the art. In other words, is by excluding an LSA from the LSDB 772 (or otherwise from route calculation), the present invention excludes storing a route based on the excluded LSA in the routing table 775.

The import/export process 780 redistributes the calculated OSPF best paths from the routing table 775 into the BGP table

765. To that end, the import/export process may convert the OSPF routes into functionally equivalent BGP routes, e.g., by adding appropriate route distinguisher (RD) values (as per RFC 2547). The import/export process 780 also may convert the OSPF AS-path sub-TLVs 550 of the OSPF best paths into functionally equivalent BGP AS-path attributes 650 that may be stored in the BGP table 765.

When a BGP update message 600 is received at the PE device 700, the BGP process 760 stores the advertised BGP routes and their associated BGP AS-path attributes 650 in the BGP table 765. The BGP process 760 may determine a set of BGP best paths for the reachable routes stored in the BGP table. Then, the import/export process 780 may redistribute the BGP best paths and their associated BGP AS-path attributes 650 from the BGP table 765 into the routing table 775. Specifically, the import/export process 780 may redistribute the BGP best paths by converting the BGP routes and their associated BGP AS-path attributes into functionally equivalent OSPF routes and OSPF AS-path sub-TLVs that may be stored in the routing table 775.

In accordance with the illustrative embodiment, the OSPF process 770 is configured to prevent routing loops by selectively installing OSPF routes in the routing table 775 based on the AS-path information stored in the routes' associated AS-path sub-TLVs 550. More specifically, when a PE device 700 receives an OSPF LSA 500 containing an AS-path sub-TLV 550, the PE device's OSPF process 770 determines whether the PE device resides in an autonomous system whose AS number is stored in the received AS-path sub-TLV 550. If so, the OSPF process determines that the LSA's advertised OSPF routes have been previously advertised to the autonomous system, and thus the OSPF process does not install the routes in its routing table 775 since the routes, if installed, could result in routing loops. In this way, the received OSPF routes are excluded from the routing table (and SPF calculations) and cannot be redistributed into BGP for future propagation through the autonomous system. Notably, the OSPF process may also be configured to prevent temporary routing loops based on additional DN bit behavior, as described above.

On the other hand, if the OSPF process 770 determines that the AS number of the PE device's autonomous system is not stored in the received AS-path sub-TLV 550, the OSPF process may install the LSA's advertised OSPF routes in the routing table 775. In this case, the installed OSPF routes and their associated AS-path sub-TLVs may be redistributed, e.g., by the import/export process 780, into the BGP table 765. The redistributed routes may be propagated in a BGP update message 600 to other, fully-meshed PE devices 700 in the autonomous system. A PE device 700 that subsequently receives the BGP update message 600 may store the advertised BGP routes in its local BGP table, redistribute the received BGP routes into its local OSPF routing table and then advertise the redistributed routes to a neighboring OSPF-configured CE device. In such a scenario, the PE device preferably sends the CE device an LSA 500 containing an updated AS-path sub-TLV 550, the updated AS-path sub-TLV storing an AS path that includes the AS number of the PE device's autonomous system.

Figure 9:
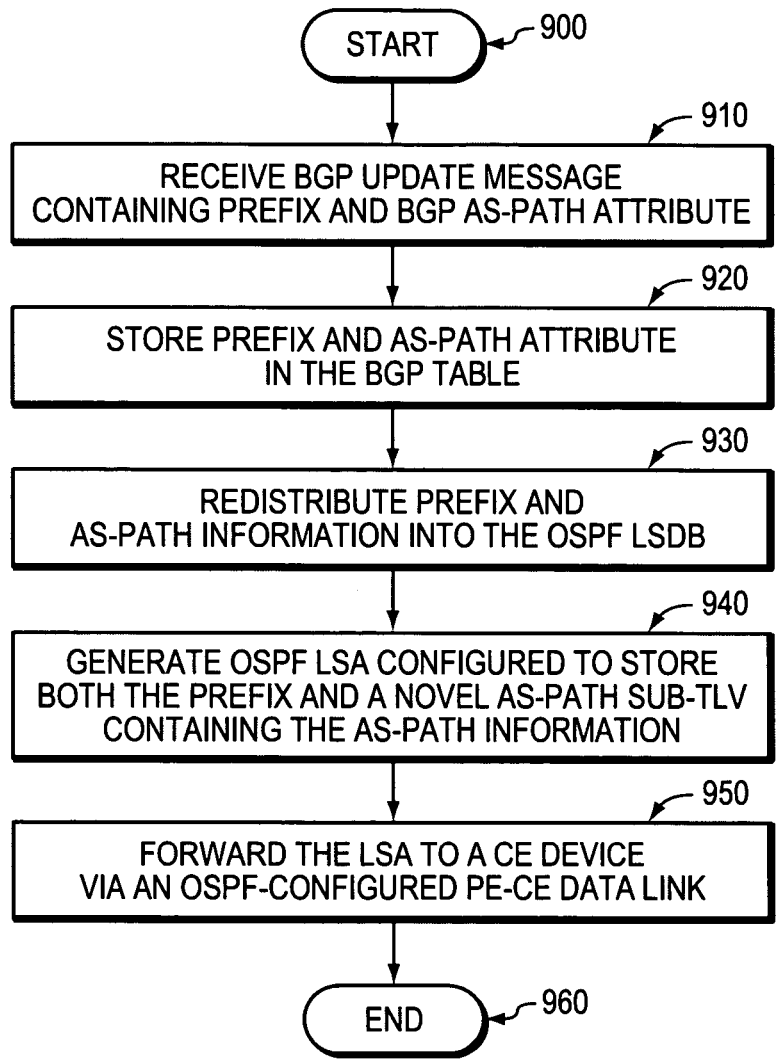
FIG. 9 is a flowchart illustrating a sequence of steps that may be performed by a network device that is configured to advertise an OSPF route and its associated AS-path sub-TLV in accordance with the illustrative embodiment.

FIG. 9 illustrates a sequence of steps that may be performed by a PE device 700 (e.g., as an egress PE device) in accordance with the illustrative embodiment. The sequence starts at step 900 and proceeds to step 910 where a BGP update message 600 containing at least one advertised BGP prefix 645 and an associated BGP AS-path attribute 650 is received at the PE device. At step 920, a BGP process 760 stores the received BGP prefix and AS-path attribute in the BGP table 765. Next, at step 930, the import/export process 780 redistributes the prefix and AS-path attribute into the OSPF routing table 775. To that end, the BGP prefix may be converted from a VPN-IPv4 BGP prefix to a conventional OSPF IPv4 prefix and the BGP AS-path attribute may be converted to a functionally equivalent OSPF AS-path sub-TLV 550. At step 940, the OSPF process 770 executing in the PE device 700 generates an LSA 500 configured to store both the redistributed OSPF prefix and its associated AS-path sub-TLV. Notably, the PE device also may update the AS-path information stored in the AS-path sub-TLV by prepending the AS number of the PE device's provider network to the list of AS numbers stored in is the AS-path sub-TLV. At step 950, the OSPF process forwards the LSA 500 to a CE device 470 via an OSPF-configured PE-CE data link 460. The sequence ends at step 960.

Figure 10:
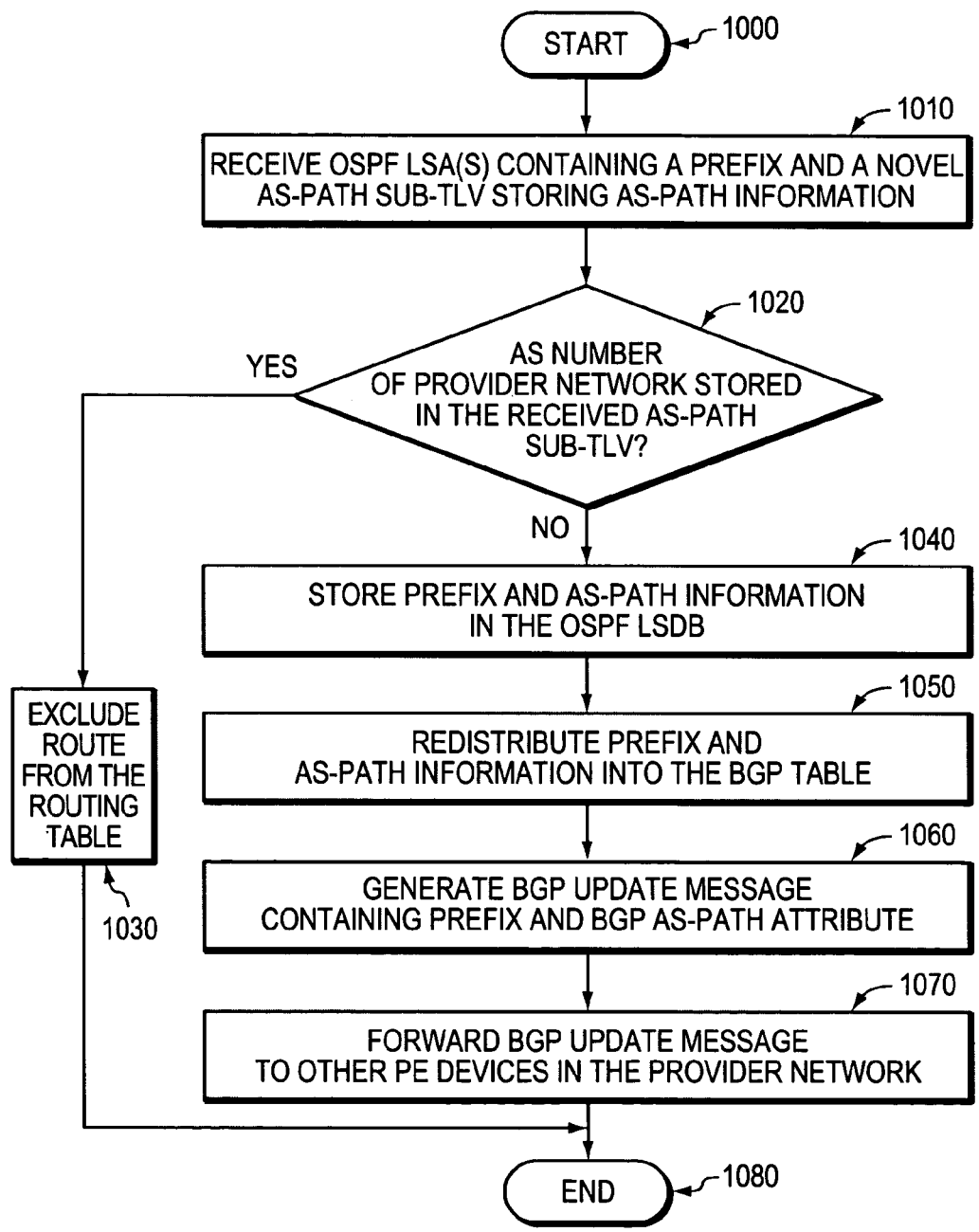
FIG. 10 is a flowchart illustrating a sequence of steps that a network device may perform for preventing routing loops in accordance with the illustrative embodiment.

FIG. 10 illustrates a sequence of steps that the PE device 700 (e.g., as an ingress PE device) may perform for preventing routing loops in accordance with the illustrative embodiment. The sequence starts at step 1000 and proceeds to step 1010 where the PE device receives one or more OSPF LSAs 500 containing at least one prefix and an associated AS-path sub-TLV 550 storing AS-path information for the at least one prefix. At step 1020, the OSPF process 770 executing in the PE device determines whether the received AS-path sub-TLV stores the AS number of the provider network containing the PE device. If so, the sequence advances to step 1030 where the OSPF process determines that the route has already been advertised throughout the provider network, and therefore the PE device does not install the route in its routing table 775; the sequence ends at step 1080.

If, on the other hand, at step 1020 the PE device 700 determines that the received AS-path sub-TLV 550 does not store the AS number of the provider network containing the PE device, then at step 1040 the OSPF process 770 executing in the PE device stores the advertised route in the routing table 775 (e.g., storing the prefix and its AS-path information from the LSA in the LSDB 772). (Notably, storing the advertised route in the routing table may override a previous DN bit-based decision to exclude the route.) Then, at step 1050, the import/export process 780 redistributes the prefix and AS-path information into the BGP table 765. At step 1060, the BGP process 760 executing in the PE device generates a BGP update message 600 containing both the redistributed prefix and a BGP AS-path attribute 650 that stores the route's associated AS-path information. The BGP process forwards the generated BGP update message 600 to other PE devices in the PE device's provider network, at step 1070. The sequence ends at step 1080.

Advantageously, the novel AS-path sub-TLV may be used to prevent routing loops without breaking backup connectivity in networks having multiple autonomous systems that are not configured to communicate with one another. For instance, unlike prior implementations, the inventive technique can prevent routing loops from developing when a route is advertised from a first customer site to a primary AS to a second customer site and then to a secondary ("backup") AS which is not in communication with the primary AS. More generally, the technique may be deployed to prevent routing loops in single-AS as well as multi-AS environments. Further, the inventive technique may be used to prevent routing loops for both internal and external routes advertised in an OSPF routing area.

The foregoing has been a detailed description of illustrative embodiments of the invention. Various modifications and additions can be made without departing from the spirit and scope of the invention. For example, although the illustrative embodiment utilizes a novel AS-path sub-TLV to prevent routing loops when OSPF is executed over PE-CE data links, it is also expressly contemplated that the teachings of the invention are equally applicable when other IGP protocols are executed over PE-CE data links. For instance, if the Intermediate-System-to-Intermediate-System (IS-IS) protocol is executed over the PE-CE links 460, the herein described OSPF AS-path sub-TLV may be replaced with a functionally equivalent IS-IS AS-path sub-TLV, e.g., that may be transported in conventional IS-IS link-state packets (LSP). Those skilled in the art will understand that the present invention is not limited to any specific network communication protocols, such as OSPF and BGP, and may be generalized to prevent routing loops in conjunction with various different interior and exterior gateway protocols.

The present invention is generally applicable for transporting any type of BGP attribute information in an OSPF LSA. Thus, while the illustrative embodiment uses the novel sub-TLV 550 for carrying BGP AS-path attribute information through an OSPF-configured network, those skilled in the art will understand that the novel sub-TLV more generally may be formatted to carry any type of BGP attribute information, such as information conventionally stored in of the BGP attributes described in the above-incorporated RFC 1771. Broadly stated, the novel OSPF sub-TLV may be configured to store BGP information that is traditionally stored in one or more BGP attributes.

It is also expressly contemplated that the teachings of this invention can be implemented as software, including a computer-readable medium having program instructions stored thereon, hardware, firmware, electromagnetic signals carrying instructions for execution by a processor, or any combination thereof. More generally, the inventive technique may be implemented in various combinations of hardware and/or software. Accordingly, this description is meant to be taken only by way of example and not to otherwise limit the scope of the invention.

What is claimed is:

1. A method, comprising:
 receiving, at a first network device, a Border Gateway Protocol (BGP) message containing at least one route having an associated BGP attribute that stores an autonomous system (AS)-path, the AS-path indicating one or more ASes traversed to reach the at least one route, the first network device being located at the edge of a first AS;
 converting the received BGP attribute into a functionally equivalent Open Shortest Path First (OSPF) type-length-value tuple (TLV) that stores the AS-path indicating the one or more ASes traversed to reach the at least one route, the OSPF TLV associated with the at least one route; and
 sending an OSPF link-state advertisement (LSA), containing both an indication the at least one route is reachable and the OSPF TLV that stores the AS-path indicating the one or more ASes traversed to reach the at least one route, to a second network device, the second network device being located at the edge of a second AS that is different than the first AS.

2. The method of claim 1, further comprising:
 propagating the OSPF LSA containing the OSPF TLV associated with the at least one route from the second network device to a third network device, the third network device being located at the edge of a third AS, the third AS not in direct communication with the first AS;
 determining, at the third network device, whether the received OSPF TLV stores an AS number corresponding to the third AS;
 excluding, in response to determining that the received OSPF TLV stores the AS number corresponding to the third AS, the at least one route from a set of OSPF routes stored at the third network device.

3. The method of claim 2, further comprising:
 converting, in response to determining that the received OSPF TLV does not store the AS number corresponding to the third AS, the received OSPF TLV into a functionally equivalent BGP attribute; and
 sending a BGP update message containing the BGP attribute associated with the at least one route from the third network device to one or more other network devices in the third AS.

4. The method of claim 3, further comprising:
 excluding the at least one route from the set of OSPF routes stored at the third network device in response to a received LSA having a set DN bit; and
 overriding the exclusion by converting the received OSPF TLV into the functionally equivalent BGP attribute in response to determining that the received OSPF TLV does not store the AS number corresponding to the third AS.

5. The method of claim 2, wherein the first network device is a provider edge (PE) device and the first AS is a first provider network, the second network device is a customer edge (CE) device and the second AS is a customer site situated adjacent to the first provider network, and the third network device is a PE device and the third AS is a second provider network situated adjacent to the customer site, the second provider network not in direct communication with the first provider network.

6. The method of claim 1, wherein the BGP attribute is a BGP AS-path attribute and the OSPF TLV is an OSPF AS-path sub-TLV.

7. The method of claim 6, wherein the OSPF AS-path sub-TLV is stored in an Inter-Area/External Route Attribute TLV (RA-TLV).

8. The method of claim 1, further comprising:
 converting, before sending the OSPF LSA to the second network device, the at least one route from a virtual private network Internet Protocol version 4 (VPN-IPv4) format to an IPv4 format.

9. A system comprising:
 a first network device situated in a first autonomous system (AS), the first network device having a processor and a memory and configured to
  receive a Border Gateway Protocol (BGP) message containing at least one route having an associated BGP attribute that stores an AS-path that indicates one or more ASes traversed to reach the at least one route;
  convert the received BGP attribute into a functionally equivalent Open Shortest Path First (OSPF) type-length-value tuple (TLV) that stores the AS-path that indicates the one or more ASes traversed to reach the at least one route, the OSPF TLV associated with the at least one route; and
  advertise an OSPF link-state advertisement (LSA) containing both an indication the at least one route is reachable and the OSPF TLV that stores the AS-path indicating the one or more ASes traversed to reach the at least one route.

10. The system of claim 9, further comprising:
 a second network device situated in a second AS, the second AS not being configured to communicate directly with the first AS, the second network device being configured to receive the advertised OSPF LSA and further configured to:
determine whether the received OSPF TLV stores an AS number corresponding to the second AS;
exclude, in response to determination that the received OSPF TLV stores the AS number corresponding to the second AS, the at least one route from a set of OSPF routes stored at the second network device.

11. The system of claim 10, wherein the second network device is further configured to:
convert, in response to determination that the received OSPF TLV does not store the AS number corresponding to the second AS, the received OSPF TLV into a functionally equivalent BGP attribute; and
advertise a BGP update message containing the BGP attribute associated with the at least one route from the second network device to one or more other network devices in the second AS.

12. The system of claim 11, wherein the second network device is further configured to:
exclude the at least one route from the set of OSPF routes stored at the third network device in response to a received LSA having a set DN bit; and
override the exclusion by conversion of the received OSPF TLV into the functionally equivalent BGP attribute in response to determination that the received OSPF TLV does not store the AS number corresponding to the third AS.

13. The system of claim 9, wherein the BGP attribute is a BGP autonomous system AS-path attribute and the TLV is an OSPF AS-path sub-TLV.

14. The system of claim 13, wherein the OSPF AS-path sub-TLV is stored in an Inter-Area/External Route Attribute TLV (RA-TLV).

15. A system, comprising:
means for receiving, at a first network device, a Border Gateway Protocol (BGP) message containing at least one route having an associated BGP attribute that stores an autonomous system (AS)-path, the AS-path indicating one or more ASes traversed to reach the at least one route, the first network device being located at the edge of a first AS;
means for converting the received BGP attribute into a functionally equivalent Open Shortest Path First (OSPF) type-length-value tuple (TLV) that stores the AS-path indicating one or more traversed to reach the at least one route, the OSPF TLV associated with the at least one route; and
means for sending an OSPF link-state advertisement (LSA) containing both an indication the at least one route is reachable and the OSPF TLV that stores the AS-path indicating the one or more ASes traversed to reach the at least one route to a second network device, the second network device being located at the edge of a second AS that is different than the first AS.

16. The system of claim 15, further comprising:
means for propagating the OSPF LSA containing the OSPF TLV associated with the at least one route from the second network device to a third network device, the third network device being located at the edge of a third AS, the third AS not in direct communication with the first AS;
means for determining, at the third network device, whether the received OSPF TLV stores an AS number corresponding to the third AS;
means for excluding, in response to determining that the received OSPF TLV stores the AS number corresponding to the third AS, the at least one route from a set of OSPF routes stored at the third network device.

17. The system of claim 16, further comprising:
means for converting, in response to determining that the received OSPF TLV does not store the AS number corresponding to the third AS, the received OSPF TLV into a functionally equivalent BGP attribute; and
means for sending a BGP update message containing the BGP attribute associated with the at least one route from the third network device to one or more other network devices in the third AS.

18. The system of claim 17, further comprising:
means for excluding the at least one route from the set of OSPF routes stored at the third network device in response to a received LSA having a set DN bit; and
means for overriding the exclusion by converting the received OSPF TLV into the functionally equivalent BGP attribute in response to determining that the received OSPF TLV does not store the AS number corresponding to the third AS.

19. The system of claim 16, wherein the first network device is a provider edge (PE) device and the first AS is a first provider network, the second network device is a customer edge (CE) device and the second AS is a customer site situated adjacent to the first provider network, and the third network device is a PE device and the third AS is a second provider network situated adjacent to the customer site, the second provider network not in direct communication with the first provider network.

20. The system of claim 15, wherein the BGP attribute is a BGP AS-path attribute and the OSPF TLV is an OSPF AS-path sub-TLV.

21. The system of claim 20, wherein the OSPF AS-path sub-TLV is stored in an Inter-Area/External Route Attribute TLV (RA-TLV).

22. The system of claim 15, further comprising:
means for converting, before sending the OSPF LSA to the second network device, the at least one route from a virtual private network Internet Protocol version 4 (VPN-IPv4) format to an IPv4 format.

23. A non-transitory computer-readable medium storing instructions for execution on a processor for the practice of a method comprising the steps of:
receiving, at a first network device, a Border Gateway Protocol (BGP) message containing at least one route having an associated BGP attribute that stores an autonomous system (AS)-path, the AS-path indicating one or more ASes traversed to reach the at least one route, the first network device being located at the edge of a first AS;
converting the received BGP attribute into a functionally equivalent Open Shortest Path First (OSPF) type-length-value tuple (TLV) that stores the AS-path indicating the one or more ASes traversed to reach the at least one route, the OSPF TLV associated with the at least one route; and
sending an OSPF link-state advertisement (LSA), containing both an indication the at least one route is reachable and the OSPF TLV that stores the AS-path indicating the one or more ASes traversed to reach the at least one route, to a second network device, the second network device being located at the edge of a second AS that is different than the first AS.

24. A node located at the edge of a first autonomous system (AS), the node comprising:
   one or more network interfaces;
   a processor coupled to the one or more network interfaces and adapted to execute software processes; and
   a random access memory (RAM) adapted to store one or more processes executable by the processor, the one or more processes configured to: i) receive a Border Gateway Protocol (BGP) message containing at least one route having an associated BGP attribute that stores an AS-path that indicates one or more ASes traversed to reach the at least one route, ii) convert the received BGP attribute into a functionally equivalent Open Shortest Path First (OSPF) type-length-value tuple (TLV) that stores the AS-path that indicates the one or more traversed to reach the at least one route, the OSPF TLV associated with the at least one route, and iii) send an OSPF link-state advertisement (LSA) containing both an indication the at least one route is reachable and the OSPF TLV that stores the AS-path indicating the one or more ASes traversed to reach the at least one route to a node located at the edge of a second AS that is different than the first AS.

25. The node of claim 24 wherein the node is a provider edge (PE) device, the first AS is a provider network, the node located at the edge of the second AS is a customer edge (CE) device and the second AS is a customer site.

26. The node of claim 24, wherein the BGP attribute is a BGP AS-path attribute.

27. The node of claim 24, wherein the OSPF TLV is an OSPF AS-path sub-TLV.

* * * * *